United States Patent [19]
Araki et al.

[11] Patent Number: 5,554,726
[45] Date of Patent: Sep. 10, 1996

[54] METHOD FOR PRODUCING HYDROGENATED NBR LATEX

[75] Inventors: Eiichi Araki; Norihiro Sugihara; Mari Kamada; Taiji Matsukawa, all of Himeji, Japan

[73] Assignee: Sumitomo Seika Chemicals Co., Ltd., Japan

[21] Appl. No.: 492,085

[22] PCT Filed: Nov. 21, 1994

[86] PCT No.: PCT/JP94/01960

§ 371 Date: Jul. 18, 1995

§ 102(e) Date: Jul. 18, 1995

[87] PCT Pub. No.: WO95/14729

PCT Pub. Date: Jun. 1, 1995

[30] Foreign Application Priority Data

Nov. 22, 1993 [JP] Japan ..................................... 5-315998

[51] Int. Cl.$^6$ ........................... C08J 3/02; C08L 9/04
[52] U.S. Cl. ................... 528/495; 528/496; 524/565; 524/571
[58] Field of Search .................. 524/565, 571; 528/495, 496

[56] References Cited

U.S. PATENT DOCUMENTS

| 3,558,576 | 1/1971 | Weller | 528/495 |
| 3,923,738 | 12/1975 | Van Sorge | 528/496 |

*Primary Examiner*—Peter A. Szekely
*Attorney, Agent, or Firm*—Pollock, Vande Sande & Priddy

[57] ABSTRACT

The object of this invention is to provide a method for producing a hydrogenated NBR latex with sufficiently reduced latex particle size and excellent standing stability without using any harmful solvent or restricting the kind of usable emulsifier.

The method for producing hydrogenated NBR latex according to this invention comprises mixing an organic layer in which a hydrogenated NBR is dissolved in an organic solvent with an aqueous layer in which an emulsifier is dissolved in water, then agitating the mixture, and removing the organic solvent by distillation, characterized in that said emulsification is performed in the presence of an alcohol.

11 Claims, No Drawings

METHOD FOR PRODUCING HYDROGENATED NBR LATEX

TECHNICAL FIELD

This invention relates to a method for producing hydrogenated NBR (nitrile-butadiene rubber) latex having small particle size and excellent standing stability. The hydrogenated NBR latex according to this invention gives high heat resistance, high oil resistance and high aging resistance to a material when a coating film is formed on it. As the result it is highly advantageous to surface treatment agent for textile and coating agent for plastics, films or sheets.

PRIOR ART

As a production technology for hydrogenated NBR latex, there has been known the method which comprises dissolving a hydrogenated NBR in an organic solvent such as toluene, dichloroethane, mixing the resulting organic solution with an aqueous solution of an emulsifying agent, agitating the mixture using a homomixer or the like, and removing the organic solvent (Japanese Kokai Publication Sho-62-201945).

However, since halogenated hydrocarbon solvents such as dichloroethane are harmful to human body, rigorous control is in force over their use in view of the enviromnental pollutions. It is, therefore, not desirable for industrial practice to employ the technology which involves the use of such solvents in large quantities.

Meanwhile, there is an ardent demand for improving the fundamental performance of common rubber latex through diminution of latex particle size and enhancement of the stability when the latex stands quietly (hereinafter refers as 'standing stability'). However, the latex particles produced by the known technology inclusive of the above-mentioned process are not as small as desired and there also is the problem that the standing stability obtained by conventional method is not commensurate with the amount of the emulsifier added.

To overcome the above disadvantages, the present inventors previously discovered that a hydrogenated NBR latex with reduced particle size and improved standing stability could be provided by the process which comprises mixing an organic solvent solution of a hydrogenated NBR and a fatty acid with an aqueous solution of an alkaline metal hydroxide and a dialkylsulfosuccinic acid, then emulsifying the mixture, and removing the organic solvent. They accordingly filed a patent application (Japanese Patent Application Hei-5-228238).

However, the above invention has the problem that because of the restriction of emulsifier which can be used, the use of the resulting hydrogenated NBR latex are also limited. Therefore, a demand for an industrial production technology with no limitation of emulsifier as well as short emulsifying time still remains.

DESCRIPTION OF THE INVENTION

Under these circumstances, the object of this invention is to provide a method for producing a hydrogenated NBR latex with sufficiently reduced latex particle size and excellent standing stability without using any harmful solvent or restricting the kind of usable emulsifier.

The gist of this invention resides in a method for producing a hydrogenated NBR latex comprising mixing an organic layer in which a hydrogenated NBR is dissolved in organic solvent with an aqueous layer in which an emulsifier is dissolved in water, then agitating the mixture, and removing the organic solvent by distillation, characterized in that said emulsification is performed in the presence of an alcohol.

This invention is now described in detail.

The hydrogenated NBR that can be used in this invention includes but is not limited to unsaturated nitrile-conjugated diene copolymer rubber whose conjugated diene unit has been hydrogenated, unsaturated nitrile-conjugated diene-ethylenically unsaturated monomer terpolymer rubber whose conjugated diene unit has been hydrogenated or the like. These copolymer rubbers can be obtained by the conventional polymerization and hydrogenation processes.

Specific examples of such hydrogenated NBR are hydrogenated butadiene-acrylonitrile copolymer rubber, hydrogenated isoprene-butadiene-acrylonitrile copolymer rubber, hydrogenated butadiene-methyl methacrylate-acrylonitrile copolymer, hydrogenated butadiene-ethylene-acrylonitrile copolymer and hydrogenated other copolymers.

The organic solvent that can be used in this invention is not particularly restricted only if it dissolves hydrogenated NBR, thus including but being not limited to aromatic hydrocarbons such as benzene, toluene, xylene or the like and ketones such as methyl ethyl ketone, methyl isobutyl ketone or the like. These solvents can be selectively employed either singly or in combination.

In this invention, the emulsifier is generally used as dissolved in water. The emulsifier is not critically limited in kind. Thus, for example, anionic, cationic and nonionic emulsifiers as well as dispersion stabilizers can be used singly or in combination.

The anionic emulsifier that can be used includes but is not limited to sodium polyoxyethylene lauryl ether sulfate, sodium alkylbenzene sulfonates, sodium alkyl sulfates, sodium naphthalenesulfonate-formaldehyde condensate, dialkyl sulfosuccinate salts, and fatty acid soaps such as higher fatty acid sodium salts and higher fatty acid potassium salts.

The anionic emulsifier is also added to water layer in the practice of this invention. However, when said fatty acid soap is employed, the procedure may be used which comprises adding the corresponding fatty acid to said organic solvent and the corresponding amount of alkaline metal hydroxide necessary for neutralization in water and mixing them to react with each other across the interface between the organic layer and the water layer in the emulsifying stage so as to provide the necessary fatty acid soap.

Said cationic emulsifier includes, for example, alkyl trimethyl ammonium chloride, polyoxyethylene alkylamine or the like. Said nonionic emulsifier includes, for example, polyoxyethylene alkylether, polyoxyethylene alkylphenylether, polyoxyethylene sorbitan alkylate, oxyethylene-oxypropylene block copolymer, polyglycerinester. Said dispersion stabilizer includes, for example, polymer dispersant such as polyvinyl alcohol, hydroxyethyl cellulose, methyl cellulose, hydroxypropyl cellulose, sodium polyacrylate, sodium polymethacrylate, styrene-maleic anhydride copolymer or the like.

In this invention, the preferred amount of said emulsifier is 0.1 to 15 weight parts based on 100 parts by weight of hydrogenated NBR. The more preferred amount is 0.5 to 10 weight parts on the same basis. If the amount of the emulsifier is less than 0.1 weight parts, desirable emulsified condition can not be obtained. Conversely the use of more than 15 parts by weight of the emulsifier is not preferred because it is not economical although the emulsification is facilitated, but also the physical properties of hydrogenated NBR latex obtained often become poor.

Alcohol used in this invention is represented by the general formula ROH (wherein R is substituted or unsubstituted, saturated or unsaturated aliphatic or aralkyl hydrocarbon laving 1 to 9 carbon atoms). This includes, for example, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, heptyl alcohol, octyl alcohol, capryl alcohol, nonyl alcohol, allyl alcohol, crotyl alcohol, propargyl alcohol, cyclopentanol, cyclohexanol, benzyl alcohol or the like. Among these, alcohol in which R is alkyl group having 1 to 5 carbon atoms is preferred, and particularly ethyl alcohol, n-propyl alcohol, isopropyl alcohol, sec-butyl alcohol, tert-butyl alcohol are more preferred. These alcohols can be used singly or in combination.

In this invention, the preferred amount of said alcohol is 10 to 2000 parts by weight based on 100 parts by weight of hydrogenated NBR. The more preferred amount is 50 to 1000 parts by weight on the same basis. If the amount of the alcohol is less than 10 parts by weight, no sufficient diminution of latex particle size can be realized in a reasonably short time. Conversely the use of more than 2000 parts by weight of the alcohol is undesirable because of the increased cost of distillation of the organic solvent and alcohol used, although the emulsification is facilitated.

In the process of this invention for producing a hydrogenated NBR latex, it is sufficient that the alcohol is present when an organic layer in which hydrogenated NBR is dissolved in organic solvent is admixed with a water layer in which said emulsifier is dissolved in water during emulsification. The general procedure comprises adding the alcohol to a water layer or to both the water layer and the organic layer beforehand and, then, mixing the two layers for emulsification. Alternatively, a predetermined amount of the alcohol may be added during emulsification by mixing both layers instead of previous addition.

When the alcohol is added to the water layer, the timing of addition is not restricted. For example, it may be added to an aqueous solution of the emulsifier or to water prior to addition of the emulsifier. When the alcohol is added to the organic layer, there is no limitation on the timing of addition as well. For example, the alcohol may be added to the organic solvent in the first place and the hydrogenated NBR be added to the resulting solution to provide the organic layer.

In adding the alcohol to the water layer only or to both the organic layer and the water layer, it is preferable to add 30 to 100% of the formulating amount of alcohol to the water layer. When the amount added to the organic layer is excessive, it takes time to attain the desired particle size.

The preferred amount of the alcohol for addition to the water layer is 50 to 100%.

Satisfactory and efficient emulsification can be accomplished by stirring with an emulsifying machine capable of providing a suitable shear force, such as a homogenizer, colloid mill or the like, or by dispersing with a sonicator or the like, although stirring is usually preferred.

In this invention, the hydrogenated NBR latex can be finally obtained by distilling off the organic solvent by heating under reduced pressure following the emulsification procedure described above.

Where necessary, the latex so obtained can be concentrated by heating, centrifugation, wet separation or other means until a suitable concentration is attained.

BEST MODE FOR IMPLEMENT THE INVENTION

The following examples further illustrate this invention. but by no means define its scope.

EXAMPLE 1

Thirty grams of hydrogenated NBR (trade name; Terban 1767, produced by Bayer Japan; containing 34 weight % of acrylonitrile and 5.5% of residual double bonds) was dissolved into 270 g of toluene followed by adding 1.5 g of oleic acid.

On the other hand, 0.3 g of potassium hydroxide and 0.6 g of sodium dioctylsulfosuccinate were dissolved in 60 g of isopropyl alcohol and 90 g of water.

Those two solutions were mixed and emulsified by stirring for 2 minutes using TK homomixer (M type, manufactured by Tokushukikakogyo) at 12000 rpm. Toluene and isopropyl alcohol were distilled off by heating this emulsified solution under reduced pressure and hydrogenated NBR latex was obtained. The obtained latex had 0.8 μm of the median particle size and had excellent standing stability with no phase separation.

Comparative Example 1

Hydrogenated NBR latex was produced as the same manner as Example 1, except that 150 g of water was used and no use of isopropyl alcohol.

The obtained latex had 2.5 μm of the median particle size.

EXAMPLE 2

Thirty grams of hydrogenated NBR (trade name; Terban 1907, produced by Bayer Japan; containing 38 weight % of acrylonitrile and not more than 1.0% of residual double bonds) was dissolved into 270 g of methyl isobutyl ketone followed by addition of 15 g of ethyl alcohol.

On the other hand, 1.5 g of potassium oleate and 0.6 g of sodium polyoxy ethylene lauryl ether sulfate were dissolved in 45 g of ethyl alcohol and 90 g of water.

Those two solutions were mixed and emulsified by stirring for 2 minutes using TK homomixer (M type, manufactured by Tokushukikakogyo) at 12000 rpm. Methyl isobutyl ketone and ethyl alcohol were distilled off by heating this emulsified solution under reduced pressure and hydrogenated NBR latex was obtained. The obtained latex had 0.7 μm of median particle size and had excellent standing stability with no phase separation.

Comparative Example 2

Hydrogenated NBR latex was produced as the same manner as Example 2, except that 150 g of water was used and no use of ethyl alcohol.

The obtained latex had 7.0 μm of median particle size, and its layers immediately separated and its standing stability was very much wrong.

EXAMPLE 3

Fifteen grams of hydrogenated NBR (trade name; Terban 1767, produced by Bayer Japan; containing 34 weight % of acrylonitrile and 5.5% of residual double bonds) was dissolved into 285 g of toluene.

On the other hand, 1.2 g of sodium lauryl benzene sulfonate was dissolved in 75 g of isopropyl alcohol and 100 g of water. Those two solutions were mixed and emulsified by stirring for 2 minutes using TK homomixer (M type, manufactured by Tokushukikakogyo) at 12000 rpm. Toluene and isopropyl alcohol were distilled off by heating this emulsified solution under reduced pressure, and hydrogenated NBR latex was obtained. The obtained latex had 0.4 µm of median particle size and had excellent standing stability with no phase separation.

EXAMPLE 4

Thirty grams of hydrogenated NBR (trade name; Terban 1767, produced by Bayer Japan; containing 34 weight % of acrylonitrile and 5.5% of residual double bonds) was dissolved into 270 g of toluene followed by adding 1.5 g of oleic acid.

On the other hand, 0.3 g of potassium hydroxide and 0.6 g of polyoxyethylenenonylphenylether were dissolved in 60 g of isopropyl alcohol and 90 g of water.

Those two solutions were mixed and emulsified by stirring for 2 minutes using TK homomixer (M type, manufactured by Tokushukikakogyo) at 12000 rpm. Toluene and isopropyl alcohol were distilled off by heating this emulsified solution under reduced pressure and hydrogenated NBR latex was obtained. The obtained latex had 0.8 µm of median particle size and had excellent standing stability with no phase separation.

EXAMPLE 5

Thirty grams of hydrogenated NBR (trade name; Terban 1767, produced by Bayer Japan; containing 34 weight % of acrylonitrile and 5.5% of residual double bonds) was dissolved into 270 g of toluene.

On the other hand, 1.5 g of polyoxyethylene nonyl phenylether and 0.6 g of oxyethylene-oxypropylene block copolymer were dissolved in 30 g of isopropyl alcohol and 90 g of water.

Those two solutions were mixed and emulsified by stirring for 2 minutes using TK homomixer (M type, manufactured by Tokushukikakogyo) at 12000 rpm. Toluene and isopropyl alcohol were distilled off by heating this emulsified solution under reduced pressure and hydrogenated NBR latex was obtained. The obtained latex had 1.1 µm of median particle size and had excellent standing stability with no phase separation.

EXAMPLE 6

Fifteen grams of hydrogenated NBR (trade name; Terban 1907, produced by Bayer Japan; containing 34 weight % of acrylonitrile and 5.5% of residual double bonds) was dissolved into 285 g of toluene.

On the other hand, 1.2 g of octadecyltrimethylammonium chloride was dissolved in 120 g of isopropyl alcohol and 90 g of water.

Those two solution were mixed and emulsified by stirring for 2 minutes using TK homomixer (M type, manufactured by Tokushukikakogyo) at 12000 rpm. Toluene and isopropyl alcohol were distilled off by heating this emulsified solution under reduced pressure and hydrogenated NBR latex was obtained. The obtained latex had 0.9 µm of median particle size and had excellent standing stability with no phase separation.

INDUSTRIAL APPLICABILITY

According to the method of this invention, hydrogenated NBR latex having sufficiently small particle size and excellent standing stability can be produced efficiently in a short time, without using harmful solvent in any step and limiting the emulsifier to be used.

We claim:

1. A method for producing a hydrogenated nitrile-butadiene rubber latex comprising mixing an organic layer in which a hydrogenated nitrile-butadiene rubber is dissolved in an organic solvent with an aqueous layer in which an emulsifier is dissolved in water, then agitating the mixture, and removing the organic solvent by distillation, characterized in that said emulsification is performed in the presence of an alcohol having the general formula of ROH (wherein R is an unsubstituted, saturated or unsaturated, aliphatic or aralkyl hydrocarbon having 1 to 9 carbon atoms).

2. The method for producing hydrogenated nitrile-butadiene rubber latex according to claim 1, wherein said alcohol is added to only said aqueous layer or to both said aqueous layer and said organic layer.

3. The method for producing hydrogenated nitrile-butadiene rubber latex according to claim 1, wherein the amount of said alcohol to be added is 10 to 2000 parts by weight based on 100 parts by weight of said hydrogenated NBR.

4. The method for producing hydrogenated nitrile-butadiene rubber latex according to claim 2, wherein 30 to 100% of said alcohol to be added is added to said aqueous layer.

5. The method for producing hydrogenated nitrile-butadiene rubber latex according to claim 1, wherein said alcohol is represented by the general formula of $R^1OH$ (wherein $R^1$ is an alkyl group having 1 to 5 carbon atoms).

6. The method for producing hydrogenated nitrile-butadiene rubber latex according to claim 5, wherein said alcohol is ethyl alcohol, n-propyl alcohol, isopropyl alcohol, sec-butyl alcohol or tert-butyl alcohol.

7. The method for producing hydrogenated nitrile-butadiene rubber latex according to claim 2, wherein the amount of said alcohol to be added is 10 to 2000 parts by weight based on 100 parts by weight of said hydrogenated nitrile-butadiene rubber.

8. The method for producing hydrogenated nitrile-butadiene rubber latex according to claim 3, wherein 30 to 100% of said alcohol to be added is added to said aqueous layer.

9. The method for producing hydrogenated nitrile-butadiene rubber latex according to claim 2, wherein said alcohol is represented by the general formula of $R^1OH$ (wherein $R^1$ is an alkyl group having 1 to 5 carbon atoms).

10. The method for producing hydrogenated nitrile-butadiene rubber latex according to claim 3, wherein said alcohol is represented by the general formula of $R^1OH$ (wherein $R^1$ is an alkyl group having 1 to 5 carbon atoms).

11. The method for producing hydrogenated nitrile-butadiene rubber latex according to claim 4, wherein said alcohol is represented by the general formula of $R^1OH$ (wherein $R^1$ is an alkyl group having 1 to 5 carbon atoms).

* * * * *